M. C. KILGORE.

Rotary Harrow.

No. 25,651.

Patented Oct. 4. 1859.

Attest.
Albert Allen
S. P. Young

Inventor.
Martin C. Kilgore

UNITED STATES PATENT OFFICE.

MARTIN C. KILGORE, OF WASHINGTON, IOWA.

IMPROVEMENT IN ROTARY HARROWS.

Specification forming part of Letters Patent No. 25,651, dated October 4, 1859.

*To all whom it may concern:*

Be it known that I, MARTIN C. KILGORE, of Washington, in the county of Washington and State of Iowa, have invented a new and useful Improvement in Rotary Harrows; and I do hereby declare that the following is a full, clear, and exact description thereof, reference being had to the accompanying drawings, and to the letters of reference marked thereon, of which—

Figure 1:
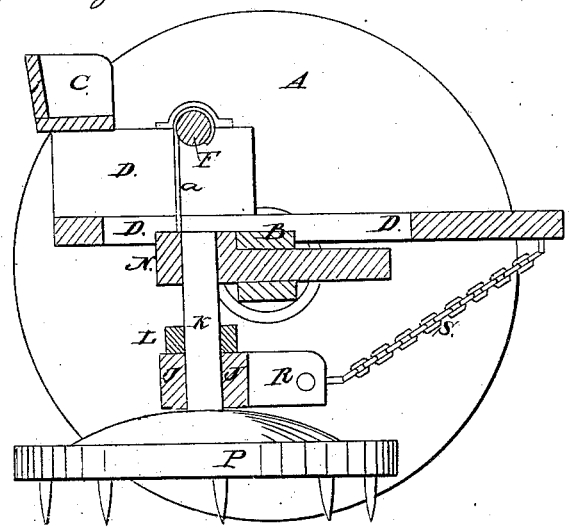
Figure 2:
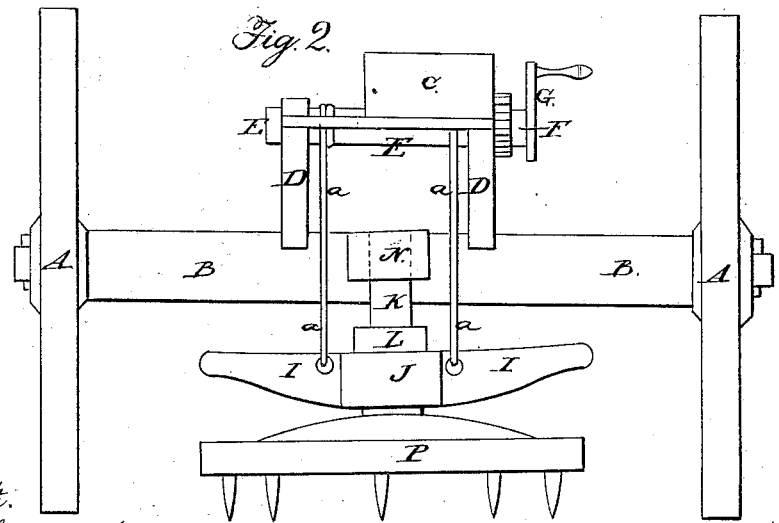

Figure 1 represents a longitudinal vertical section taken through the harrow and frame. Fig. 2 is a view of the rear of the machine in elevation.

To enable others skilled in the art to make and use my improvement, I will proceed to describe its construction and operation.

A A are two large wheels, B the axle, and C the driver's seat, placed to one side of the frame or platform D and resting upon the axle B. E is a shaft or windlass which has its bearings in either side of the frame, and is placed front of the driver's seat and just in rear of the axle B.

On the right of the driver's seat is a ratchet-wheel, F, fixed to the windlass, into the teeth of which works a pawl, and on the end of the windlass is a crank, G. Around this windlass E pass two chains or cords, *a a*, which pass down vertically just behind the axle, and are connected to arms I I projecting from a collar, J, through which the spindle K of the rotary harrow passes. Immediately above this collar is a ring, L, which keeps the collar down and in place around the spindle. Projecting centrally from the rear of the axle B is a socket, N, which has its bearings on a pivot, so as to allow it a laterally-rocking motion. Through this socket passes loosely the spindle K of the harrow P. The collar J has a projection, R, proceeding from the front part of it, to which is attached a chain, S, connecting with the front of the bifurcated beam D. This chain acts as a brace to strengthen the parts supporting the harrow against any longitudinal or forward strain.

The object of this invention is to raise the harrow free from the ground for the purpose of transportation, &c., at the same time arranging the parts in such manner that one side of the harrow can be slightly raised from the ground in order that the other may preponderate, and thus effect a rotary motion without weights. Also, the harrow is placed by this arrangement above described under the perfect control of the driver, who operates it by the crank-handle G. The machine can be made cheap, simple, and very efficient in its operation, none of the points being liable to derangement.

What I claim as my invention, and desire to secure by Letters Patent, is—

The arrangement and combination of the windlass E, arms I, socket N, collar J, harrow P, and spindle C, as and for the purpose herein shown and described.

MARTIN C. KILGORE.

Witnesses:
ALBERT ALLEN,
S. P. YOUNG.